United States Patent [19]

Suda et al.

[11] Patent Number: 4,581,404

[45] Date of Patent: Apr. 8, 1986

[54] FLAME RETARDED RESIN COMPOSITION

[75] Inventors: Susumu Suda, Higashi-Matsuyama; Yoshitane Watanabe, Tokyo; Chiaki Hosoi; Takai Kawashima, both of Chiba, all of Japan

[73] Assignee: Nissan Chemical Industries, Ltd., Tokyo, Japan

[21] Appl. No.: 687,132

[22] Filed: Dec. 28, 1984

[30] Foreign Application Priority Data

Jan. 11, 1984 [JP] Japan ................................. 59-3035

[51] Int. Cl.$^4$ ............................................. C08K 3/32
[52] U.S. Cl. .................................... 524/410; 423/306
[58] Field of Search .............................. 524/417, 410; 260/DIG. 24; 428/921; 423/306, 617; 252/606, 608, 609, 610, 611; 106/18.14, 18.28, 303

[56] References Cited

U.S. PATENT DOCUMENTS

| | | | |
|---|---|---|---|
| 3,468,844 | 9/1969 | Merriam et al. | 524/409 |
| 3,560,441 | 2/1971 | Schwarcz et al. | 524/409 |
| 3,836,490 | 9/1974 | Bockmann et al. | 524/611 |
| 4,362,658 | 12/1982 | Contin | 524/410 |
| 4,464,501 | 8/1984 | Taubert et al. | 524/410 |

FOREIGN PATENT DOCUMENTS 13199 of 1895 United Kingdom .
785610 10/1957 United Kingdom .

OTHER PUBLICATIONS

James J. Pitts, "Antimony-Halogen Synergistic Reactions in Fire Retardants", J. Fire and Flammability, 51-84, 1972.

Primary Examiner—Veronica P. Hoke
Attorney, Agent, or Firm—Frishauf, Holtz, Goodman & Woodward

[57] ABSTRACT

A flame retarded resin composition, which comprises 100 parts by weight of a synthetic resin, a sodium antimony phosphate amorphous product mixed in an amount of 0.05 to 30 parts by weight based on said synthetic resin, and optionally a flame retardant such as an organic halogenated compound further mixed in an amount of 1 to 30 parts by weight based on said synthetic resin. The resin composition has good transparency and coloring property.

15 Claims, No Drawings

FLAME RETARDED RESIN COMPOSITION

BACKGROUND OF THE INVENTION

This invention relates to a flame retarded resin composition having good transparency and coloring property. More particularly, it relates to a flame retarded resin composition having good transparency and coloring property, comprising a synthetic resin incorporated with a sodium antimony phosphate amorphous product obtained by reacting sodium antimonate with phosphoric acid.

Synthetic resins such as polyethylene, polycarbonate, polyester, polysulfone and ABS (acrylnitrile-butadienestyrene) resin have various advantages, but have also a disadvantage that they are readily flamable. Therefore, in order to impart flame retardancy to these resins, there have been proposed to use various additives. A method generally available therefor is to use halogenated compounds in combination with phosphoric compounds or antimony trioxides, and has been widely used because principal properties of the resins are little impaired thereby. However, in such a method, transparency of a resin molding is seriously injured by the influence of antimony trioxide and color tone thereof is also harmed. Accordingly, applications thereof have been extremely limited in the field where much account of the transparency and coloring property is made.

Heretofore, there have been made several proposals to impart flame retardancy to the resins without adversely affecting the transparency and the coloring property. For instance, there have been proposed a method in which the transparency is kept by making particle size of antimony trioxide not more than 0.15 $\mu$m, particularly not more than 0.1 $\mu$m (Japanese Patent Publication No. 7170/1971), a method in which the resin is made flame retardative by adding an alkali salt of an antimonic acid to a halogenated compound (Japanese Patent Publication No. 33904/1975), etc. Most of these attempts, however, have been useful only for certain limited resins and under restricted compounding conditions, and actually have not produced satisfactory effects. In recent years, along with the developments in electronic and electric industries, automobile industries, construction industries and the like, flammability of parts and materials to be used in these industries has been questioned and it has become important that these parts and materials are flame retardative. In particular, materials having excellent transparency and coloring property have been sought after increasingly as the variety of demands increases.

SUMMARY OF THE INVENTION

In view of the foregoing circumstances, the present inventors have made intensive studies on a flame retarded resin composition which can be excellent in transparency and coloring property and also can be free from impairing the principal properties the synthetic resins have in nature. As a result, it was found that a resin composition which sufficiently attains the object of this invention can be obtained by mixing a synthetic resin with a sodium antimony phosphate amorphous product obtained by reacting sodium antimonate with phosphoric acid, and further a resin composition having more excellent flame retardancy can be obtained by adding a flame retardant such as an organic halogenated compound at the same time when mixing the synthetic resin with the above sodium antimony phosphate amorphous product.

According to this invention, there is provided a flame retarded resin composition having good transparency and coloring property, which comprises 100 parts by weight of a synthetic resin, a sodium antimony phosphate amorphous product mixed in an amount of 0.05 to 30 parts by weight based on said resin, and optionally, a flame retardant such as an organic halogenated compound further mixed in an amount of 1 to 30 parts by weight based on said resin.

DESCRIPTION OF THE PREFERRED EMBODIMENTS

The above sodium antimony phosphate is preferably obtained by reacting sodium antimonate with phosphoric acid.

When obtaining the sodium antimony phosphate amorphous product by the reaction of sodium antimonate with phosphoric acid, the sodium antimonate to be used may be any of sodium antimonates produced by the dry method or those by the wet method, such as antimonate which is a by-product formed when lead is subjected to alkali refining by the Harris method. As the phosphoric acid, there may be mentioned dry phosphoric acid produced by combustion and hydrolysis of elementary phosphorus and wet phosphoric acid produced by sulfur decomposition of a rock phosphate, but any of phosphoric acids may be used in this invention without any limitation to the preparation method.

The synthetic resin to be used in this invention is thermoplastic resin, thermosetting resin and synthetic rubber such as thermoplastic elastomer. Mixture of one or more kinds of these may be used in this invention. These may be selected depending on the various functions which the synthetic resins may have in accordance with their uses. Typical examples thereof are, as the thermoplastic resins, polyethylene, polypropylene, polyvinyl acetate, polystyrene, polybutane, polycarbonate, polyvinyl chloride, polyester, polysulfone, etc., which may be used as a homopolymer, a copolymer of different monomers, or a mixture of these. Examples of the thermoseting resins are epoxy series resin, phenol series resin, melamine series resin, unsaturated polyester series resin, vinylester series resin, allyl series resin, silicone series resin, etc., which may be used as a homopolymer, a copolymer or a mixture of these. Of these resins, particularly preferred is polysulfone.

Examples of the flame retardant which is optionally used in this invention for the purpose of enhancing the flame retardancy, are organic halogenated compounds including low molecular organic compounds such as hexabromobenzene, hexachlorobenzene, pentabromobenzene, pentachlorotoluene, pentabromophenol, pentachlorophenol, hexabromobiphenyl, decabromobiphenyl, tetrabromobutane, hexabromocyclododecane, perchloropentacyclodecane, decabromodiphenylether, octabromodiphenylether, hexabromodiphenylether, ethylenebis(tetrabromophthalimide), tetrachlorobisphenol A, tetrabromobisphenol A, etc., a halogenated polycarbonate (e.g., a polycarbonate oligomer produced by use of a brominated bisphenol A as a starting material), a halogenated epoxy compound (e.g., a diepoxy compound produced by reacting a brominated bisphenol A with epichlorohydrine and a monoepoxy compound obtained by reacting a phenol bromide with epichlorohydrine), polychlorostyrene, brominated polystyrene, poly(dibromophenylene oxide), chlorinated paraffin, polyvinyl chloride and a copolymer thereof, tetrachlorophthalic anhydride, etc. When used, the flame retardant should be used by selecting one or more kinds of these while taking into consideration the properties of the synthetic resin to be used in this invention and the use of the resin composition of this invention.

The amorphous sodium antimony phosphate which is one of the components of the resin composition according to this invention is a glassy substance which can be produced by a fusing method. Fused glass thus obtainable, however, is defective in that it requires high production cost and moreover is difficult to finely grind.

In this invention, it is preferred to use a novel method in which a colloidal solution of sodium antimony phosphate glass is prepared by reacting sodium antimonate with phosphoric acid, and then dried to obtain a glassy (amorphous) product of sodium antimony phosphate. In the following, described are the method for producing the sodium antimony phosphate amorphous product and the properties of the same.

The sodium antimony phosphate amorphous product is obtained by a process comprising adding phosphoric acid to an aqueous dispersion system of the above sodium antimonate, treating it by heating at 50° to 100° C. to obtain a reaction product, which is then dehydrated to dryness. In this process, it was found that the property of an aqueous solution of the reaction product is remarkably differentiated depending on the mixing ratio of sodium antimonate and phosphoric acid. Detailed researches revealed the following:

(1) The larger the ratio of phosphoric acid/sodium antimonate is, the more readily sodium antimonate is dissolved in phosphoric acid.

(2) The aqueous solution of the product formed by the reaction of sodium antimonate and phosphoric acid is a colloidal solution. The smaller the ratio of phosphoric acid/sodium antimonate is, the more readily the product is gelated because of higher viscosity of the solution.

(3) Usually, molar ratio of $Na_2O/Sb_2O_5$ in the sodium antimonate is substantially 1.0. However, it is possible to obtain sodium antimonate of smaller molar ratio of $Na_2O/Sb_2O_5$ by treating the sodium antimonate with a mineral acid. The smaller the ratio of $Na_2O/Sb_2O_5$ is, the lower the solubility of sodium antimonate in phosphoric acid becomes. And, when the molar ratio of $Na_2O/Sb_2O_5$ is 0.3 or lower, the sodium antimonate will not dissolve in phosphoric acid even if the amount of phosphoric acid is increased.

(4) In the reaction of sodium antimonate with phosphoric acid, it is possible to add, if necessary, other phosphates with alkali metals, alkaline earth metals, zinc, lead, etc.

As the above facts were made clear, a powdery substance was obtained by drying the aqueous solution of the product obtained by the reaction of sodium antimonate with phosphoric acid. In drying, a spray dryer, a drum dryer, a hot wind drying machine, a reduced pressure drying machine, etc. may be used. When a drying means other than the spray dryer is used, the powdery substance can be ground by means of a Jet-O-mizer, a pin-disk mill, a ball mill, etc. Powder of average particle size of 2 to 30 μm can be obtained by either of these means. Most preferred drying means is a spray dryer, since spherical particles having average particle size of 2 to 10 μm can be obtained by it.

Detailed examination on the properties of the powdery dried substance was carried out to reveal the following:

(1) As a result of X-ray diffraction, the dried substance was found to be amorphous, and was determined to be in the glassy state from an optical observation.

(2) As a result of differential thermal analysis and thermogravimetric analysis, the dried substance was found to exhibit no thermal change other than the dehydration even at 500° C. or higher, and therefore to be highly stable to heat. It is possible to reduce the moisture content to 0.5% or less by keeping the drying temperature at 350° C.

From the foregoing detailed studies, it was made clear that it is particularly preferred in the production of the sodium antimony phosphate amorphous product that the composition of the same is such that the molar ratio of $P_2O_5/Sb_2O_5$ is in the range of from 0.3 to 1.5, and the molar ratio of $Na_2O/Sb_2O_5$ is in the range of from 0.5 to 1.5.

The above synthetic resin, the amorphous product and the flame retardant such as the organic halogenatd compound to be added optionally are blended to give the present flame retardant resin composition of good transparency and coloring property. If necessary, the resultant resin composition may be molded into a pellet. Also, the synthetic resin used in this invention may be in the form of a pellet, but should be preferably in the form of a powder or a granule having average particle size of 1 mm or less. Further, the amorphous product used in this invention should also be preferably in the form of a powder having average particle size of 30 μm or less.

The above synthetic resin, the amorphous product and the flame retardant such as the organic halogenated compound to be added optionally are sufficiently mixed by means of a high-speed rotating mixer, a V-type mixer, a ribbon mixer, a tumbler type mixer, etc. The mixing ratio of the amorphous product is in the range of 0.05 to 30 parts by weight, preferably 0.1 to 20 parts by weight, based on 100 parts by weight of the synthetic resin. The organic halogenated compound to be used optionally is added generally in an amount of 1 to 30 parts by weight based on 100 parts by weight of the synthetic resin.

Further, other additives may be incorporated in the flame retarded resin composition of this invention so far as they do not block the object of this invention. Examples of such additives are metal soap, an epoxy stabilizer, a plasticizer, an organic chelater, pigment, an antistatic agent, a antifogging agent, a surface processing agent, a lubricant, an antioxidant, a light-stabilizer, an ultra violet absorbent, a whitening agent, a fungicide, a photodegradating agent, borate, a processing aid, a releasing agent, a reinforcing agent, other flame retardants, etc.

As described above, a flame retardant resin composition having good transparency and coloring property can be obtained according to this invention. In the following Examples, this invention will be described in greater detail. However, this invention should be construed not to be limited by the following Examples.

In Examples and Comparative Examples, evaluation of the flame retarded resin composition and preparation of the sodium antimony phosphate amorphous product (glassy substance) were made by the following method:

Flame retardation effect: According to UL Standard No. 94 in U.S.A., examination and judgement were made by using test pieces of ⅛ inch (about 3.2 mm) thick.

When the ranks on the effects are arranged in the order of the more excellent flame retardation effect, they are 94V-0, 94V-1, 94V-2 and 94HB, respectively.

Evaluation of transparency: A digital colorimetry color difference meter produced by Suga Shikenki K.K. was used for measurement to determine the transmittance of total light.

Coloring property: Goodness or poorness in the blue color vividness was judged by using test piece compositions employing the same synthetic resins.

The test pieces used in Examples and Comparative Examples were prepared by sufficiently mixing the components by means of a high-speed rotating mixer (a super mixer produced by Kawada Seisakusho K.K.), and subjecting the resultant mixture to injection molding by use of a mold capable of forming a test piece having thickness of ⅛ inch (about 3.2 mm; IS-90B, produced by Toshiba Kikai K.K.).

Preparation of sodium antimony phosphate glassy substance: 0.68 kg of 85% phosphoric acid was added to 17.2 kg of an aqueous solution in which dispersed were 12.2% of sodium antimonate (as $Na_2O.Sb_2O_5.6H_2O$; 64% $Sb_2O_5$, 12.5% $Na_2O$, 23.5% $H_2O$), which were allowed to react at 80° C. for 4 hours. Thereafter, the reaction product was dehydrated to dryness (180° C.) by means of a spray dryer, and further heat-dried at 310° C., followed by cooling to room temperature to obtain a glassy substance. The glassy substance thus obtained was in the form of a powder comprising substantially spherical particles having average particle size of about 6μ. The component ratio of $Na_2O:Sb_2O_5:P_2O_5$ was substantially 1:1:1 in molar ratio.

which Ex. 1 to Ex. 8 and Comp. 1 to Comp. 6 correspond to Examples 1-6 and Comparative Examples 1-6, respectively).

Synthetic resins and other additives used were as follows:

Synthetic Resin

High density polyethylene: NISSAN polyethylene, produced by Nissan Maruzen Polyethylene Co., Ltd.
Polyvinylchloride: 700D, produced by Toyo Soda Mfg. Co., Ltd., mean molecular weight: 1000
ABS resin: ABS-35, produced by Japan Synthetic Rubber Co., Ltd.
Polyester: TR-2000, produced by Teijin Ltd.
Polycarbonate: NOVALECS 7025P, produced by Mitsubishi Chemical Industries Co., Ltd.
Polysulfone: Udel Polysulfone P-1700, produced by Union Carbide Corp.
Antimony trioxide: TYPE "K", produced by Sumitomo Metal Mining Co., Ltd.
Tetrabromobisphenol A: BA-59, produced by Great Lakes Chemical Corp.
Stabilizer: Produced by Nissan Ferro Organic Chemical Co., Ltd.,
LTL257 1.5 parts by weight
BP 58 BW 1.0 parts by weight
Produced by Adeca Argas Inc.
0-130 S 1.0 parts by weight
Plasticizer: Dioctylphthalate 50 parts by weight, produced by Shinnippon Physical Chemical Co., Ltd.
Blue pigment: TXH-5470 Blue, produced by Toyo Ink Mfg. Co.

TABLE 1

| | Ex. 1 | Comp. 1 | Ex. 2 | Comp. 2 | Ex. 3 | Comp. 3 | Ex. 4 | Comp. 4 | Ex. 5 | Comp. 5 | Ex. 6 | Ex. 7 | Ex. 8 | Comp. 6 |
| --- | --- | --- | --- | --- | --- | --- | --- | --- | --- | --- | --- | --- | --- | --- |
| Mixing materials (parts by weight) | | | | | | | | | | | | | | |
| High density polyethylene | 100 | 100 | — | — | — | — | — | — | — | — | — | — | — | — |
| Polyvinylchloride | — | — | 100 | 100 | — | — | — | — | — | — | — | — | — | — |
| ABS resin | — | — | — | — | 100 | 100 | — | — | — | — | — | — | — | — |
| polyester | | | | | | | | | | | | | | |
| Polycarbonbate | — | — | — | — | — | — | — | — | 100 | 100 | — | — | — | — |
| Polysulfone | — | — | — | — | — | — | — | — | — | — | 100 | 100 | 100 | 100 |
| Sodium antimony phosphate glassy substance | 5 | — | 5 | — | 5 | — | 5 | — | 4 | — | 0.10 | 0.25 | 1.0 | — |
| Antimony trioxide | — | 5 | — | 5 | — | 5 | — | 5 | — | 4 | — | — | — | 1.0 |
| Tetrabromobisphenol A | 15 | 15 | — | — | 25 | 25 | 10 | 10 | — | — | — | — | — | — |
| Stabilizer | — | — | 3.5 | 3.5 | — | — | — | — | — | — | — | — | — | — |
| Plasticizer | — | — | 50 | 50 | — | — | — | — | — | — | — | — | — | — |
| Blue pigment | 0.5 | 0.5 | 0.5 | 0.5 | 0.5 | 0.5 | 0.05 | 0.05 | 0.05 | 0.05 | 0.05 | 0.05 | 0.05 | 0.05 |
| Evaluation: | | | | | | | | | | | | | | |
| Flame retardancy test | 94HB | 94HB | 94V-0 | 94V-0 | 94V-0 | 94V-0 | 94V-0 | 94V-0 | 94V-0 | 94V-0 | 94V-0 | 94V-0 | 94V-0 | 94V-0 |
| Transparency (%) | 8 | 5 | 33 | 9 | 5 | 3 | 23 | 2.9 | 30 | 4.0 | 75 | 70 | 63 | 3.8 |
| Coloring property | good | poor | good | poor | good | poor | good | poor | good | poor | good | good | good | poor |

EXAMPLES 1-8 AND COMPARATIVE EXAMPLES 1-6

Glassy substances prepared as in the above were mixed as shown in Table 1 below to prepare resin compositions. Results are shown together in Table 1 (in

We claim:

1. A flame retarded resin composition, which comprises 100 parts by weight of a synthetic resin selected from the group consisting of polycarbonate, polyvinyl chloride, and polysulfone, and a sodium antimony phosphate amorphous product mixed in an amount of 0.05 to 30 parts by weight based on said synthetic resin.

2. The flame retarded resin composition according to claim 1, wherein said sodium antimony phosphate amorphous product is mixed in an amount of 0.1 to 20 parts by weight based on said synthetic resin.

3. The flame retardant resin composition according to claim 1, wherein said resin composition further comprises another flame retardant mixed in an amount of 1 to 30 parts by weight based on said synthetic resin.

4. The flame retarded resin composition according to claim 3, wherein said flame retardant is an organic halogenated compound.

5. A flame retarded resin composition according to claim 1, wherein said synthetic resin is polycarbonate.

6. A flame retarded resin composition, which comprises 100 parts by weight of a synthetic resin selected from the group consisting of polycarbonate, polyvinyl chloride and polysulfone, and a sodium antimony phosphate amorphous product mixed in an amount of 0.05 to 30 parts by weight based on said synthetic resin; wherein said sodium antimony phosphate amorphous product has the composition that the molar ratio of $P_2O_5/Sb_2O_5$ is in the range of from 0.3 to 1.5 and the molar ratio of $Na_2O/Sb_2O_5$ is in the range of from 0.5 to 1.5, and is produced by process comprising adding phosphoric acid to an aqueous dispersion system of sodium antimonate, followed by heating at 50° to 100° C., and dehydrating the reaction product obtained to dryness.

7. A flame retarded resin composition according to claim 6, wherein said synthetic resin is polysulfone.

8. A flame retarded resin composition according to claim 6, wherein said synthetic resin is polycarbonate.

9. A flame retarded resin composition, which comprises 100 parts by weight of a synthetic resin selected from the group consisting of polyethylene, polypropylene, polyvinyl acetate, polystyrene, polybutane, polycarbonate, polyvinyl chloride, polyester and polysulfone; an organic halogenated compound flame retardant mixed in an amount of 1 to 30 parts by weight based on said synthetic resin; and a sodium antimony phosphate amorphous product mixed in an amount of 0.05 to 30 parts by weight based on said synthetic resin.

10. The flame retarded resin composition according to claim 9, wherein said sodium antimony phosphate amorphous product is produced by a process comprising adding phosphoric acid to an aqueous dispersion system of sodium antimonate, followed by heating at 50° to 100° C., and dehydrating the reaction product obtained to dryness.

11. The flame retarded resin composition according to claim 9, wherein said sodium antimony phosphate amorphous proudct has the composition that the molar ratio of $P_2O_5/Sb_2O_5$ is in the range of from 0.3 to 1.5 and the molar ratio of $Na_2O/Sb_2O_5$ is in the range of from 0.5 to 1.5.

12. The flame retarded resin composition according to claim 11, wherein said sodium antimony phosphate amorphous product is produced by a process comprising adding phosphoric acid to an aqueous dispersion system of sodium antimonate, followed by heating at 50° to 100° C., and dehydrating a reaction product obtained to dryness.

13. The flame retarded resin composition according to claim 9, wherein said sodium antimony phosphate amorphous product is mixed in an amount of 0.1 to 20 parts by weight based on said synthetic resin.

14. The flame retardant resin composition according to claim 9, wherein said synthetic resin is polysulfone.

15. The flame retarded resin composition according to claim 9, wherein said synthetic resin is polysulfone.

* * * * *

UNITED STATES PATENT AND TRADEMARK OFFICE
CERTIFICATE OF CORRECTION

PATENT NO. : 4,581,404
DATED : April 8, 1986
INVENTOR(S) : Susumu SUDA et al

It is certified that error appears in the above-identified patent and that said Letters Patent is hereby corrected as shown below:

Columns 5 and 6, TABLE 1, in the vertical columns for "Ex. 4 and Comp. 4", in the horizontal line of "polyester", insert the numeral --100-- in both vertical columns.

Column 8 (claim 14), line 34, change "claim 9" to --claim 1--.

Signed and Sealed this

Twenty-eighth Day of October, 1986

[SEAL]

Attest:

DONALD J. QUIGG

*Attesting Officer*     *Commissioner of Patents and Trademarks*